United States Patent [19]
Schubach

[11] 3,739,527
[45] June 19, 1973

[54] KNOCKOUT WINDOW FOR VEHICLE
[75] Inventor: Theodor C. Schubach, Bonita, Calif.
[73] Assignee: Rohr Industries, Inc., Chula Vista, Calif.
[22] Filed: Nov. 26, 1971
[21] Appl. No.: 202,504

[52] U.S. Cl. .................................... 49/466, 49/141
[51] Int. Cl. .............................................. E06b 7/18
[58] Field of Search .................... 49/141, 463, 465, 49/466, 276, 278

[56] References Cited
UNITED STATES PATENTS
2,830,843  4/1958  Seaburg et al. .................... 49/141 X
2,572,124  10/1951  Eichner ............................ 49/466 X

*Primary Examiner*—Kenneth Downey
*Attorney*—George E. Pearson

[57] ABSTRACT

A knockout window for a vehicle, such as a bus or mass transit car, has a surrounding marginal seal and is held in closed, sealing position between a fixed retaining element mounted on one side of a window frame structure, and an eccentric element provided on a rocker mounted on the other side of the window frame structure. Actuating means having a substantial mechanical advantage are provided for swinging the rocker in a direction to tilt the rocker so as to swing the eccentric element outwardly, thereby forcing the portion of the window with which it is in engagement outwardly free of the eccentric element and the frame structure, whereupon the window either falls free, or may be easily pushed open, allowing escape through the window opening.

6 Claims, 2 Drawing Figures

KNOCKOUT WINDOW FOR VEHICLE

BACKGROUND OF THE INVENTION

Heretofore various types of vehicle windows have been developed which can be opened to allow escape in the event of an emergency. However, some of such prior structures are either complex, heavy, difficult to operate, or apt to freeze up in the event of long disuse so as to comprise a trap rather than an avenue of escape. Since the windows of an air conditioned vehicle are not intended to be opened except in the event of an emergency, they should be capable of being opened promptly and easily should an emergency arise.

PURPOSE OF THE INVENTION

A primary objective of the present invention is to provide a knock-out window for a bus or other vehicle, which window is held in closed, sealing relation with a window frame structure by a rocker mounted with its rocking axis extending along one side of the window frame structure, which window is instantly removable by actuation of the rocker in order to provide an escape opening in the event of an emergency. A further objective is to releasably secure a vehicle window in a window frame structure with one edge of the window retained by a retaining member provided on one side of the window frame structure and the opposite edge of the window engaged by an eccentric portion of a rocker mounted on the opposite side of the window frame. Releasable latch means holds the rocker member in window sealing position, and actuating means having a substantial mechanical advantage are provided for swinging the rocker so as to free the window from its frame.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figures 1, 2:
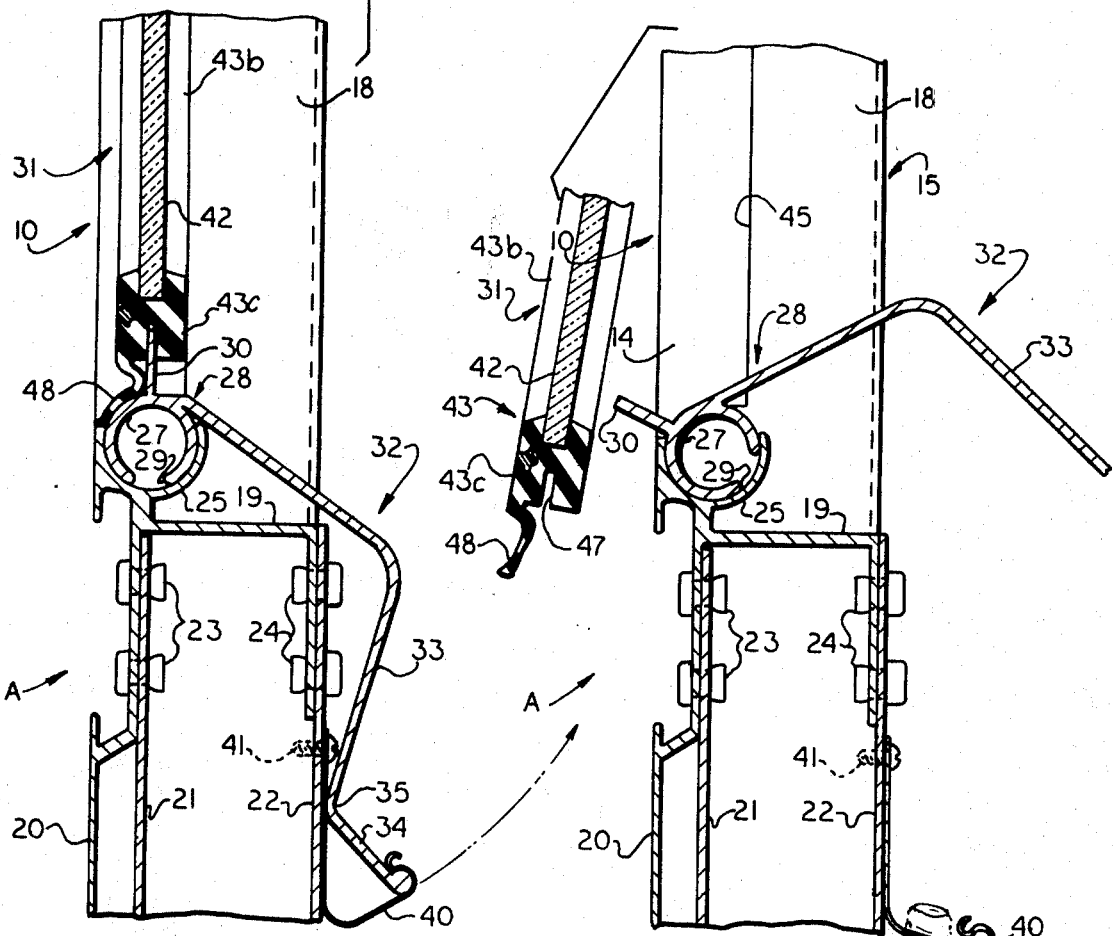
FIG. 1 is a fragmentary, sectional view through a window and window frame structure embodying the invention, intermediate portions being broken away, the window being shown in closed, sealing position.
FIG. 2 is a similar view of the lower portion of FIG. 1 with the rocker member freed from its latch and swung to window freeing position.

Referring to the drawings in detail, fragments of a vehicle A, such as a bus or mass transit car, comprise a side wall 10 and roof structure 11, securely interconnected by interlocking flanges 12, and rivets 13. Each window opening 14 in the wall 10 is surrounded by frame structure 15, herein referred to as either a window frame or frame structure, and comprises a top extrusion 17, side mullions 18 or side wall end members as the case may be, and a sill extrusion 19.

The sill extrusion 19, which, like the other extrusions illustrated may be, for example, of aluminum, is formed with an integral wall strake 20. A flange 21 and inner wall liner 22 are riveted to this extrusion 19 by rivets 23 and 24, respectively. An upwardly open trough 25 of internal circular cross sectional shape is formed integrally with the sill extrusion 19 and extends transversely across the bottom of the window opening 14.

Seated for rocking movement in the trough 25 is the tubular portion 27 of a rocker 28, which extends the entire width of the window opening, a gap 29 being provided along the bottom of the tubular rocker portion 27. A radially extending, window engaging, eccentric flange 30, also extending the full width of the window opening, is integral with the tubular portion 27, and is substantially parallel to the plane of a window 31 mounted in the frame structure 15 when the rocker 28 is swung to seat the window in its frame as shown in FIG. 1.

A rocker actuating flange 32, also integral with the tubular portion 27, extends initially angularly downwardly and inwardly from the upper portion of the tubular portion 27 in its position of FIG. 1, thence downwardly and outwardly at 33, and finally downwardly and inwardly at 34. The radial extent of the actuating flange 32 from the rocking axis of the rocker 28 is several times that of the eccentric flange 30 so as to provide a substantial mechanical advantage for actuating the rocker.

When the eccentric flange 30 is in its upright, window sealing position shown in FIG. 1, the bend 35 between the two lowermost actuating flange portions 33 and 34 rests as a limit stop against the wall liner 22, and the flange 32 is retained in this position by a narrow, releasable spring clip 40 which hooks over the lower edge of the actuating flange 32 and is attached to the wall liner 22 by screws 41.

The window 31 comprises a glass sheet 42, preferably safety glass of the type commonly used for such purpose, and a channeled marginal seal 43 fitted marginally thereto and of suitable, weather proof material, such as, for example, neoprene. The upper portion 43a of the seal 43 which extends along the upper edge of the window glass 42 has an upwardly open groove therein to receive an upper retaining flange 44 formed integrally with the upper wall extrusion 17, and extending entirely across the window opening, while the side portions 43b of the seal 43 seat in sealing relation on seats 45 provided one in each of the mullions 18 or end members. The bottom portion 43c of the seal 43 has a downwardly open groove 47 therein to receive the eccentric rocker flange 30, and an integral lip 48 preferably projects downwardly from the lower, outer edge of the bottom portion 43c of the seal, and extends over the joint between the trough 25 and the tubular rocker portion 27 to carry off runoff water from the window.

While shown with the rocker 28 mounted on the bottom of the window frame structure 15 and the retaining element 44 on the top, these members may be located on any two opposite sides of a window opening as desired.

OPERATION OF THE ILLUSTRATIVE FORM OF THE INVENTION

With a vehicle window 31 embodying the invention seated in a window frame structure 15 as shown in FIG. 1, and the rocker actuating flange 32 latched in window securing position by the latch clip 40, the upright eccentric flange 30 of the rocker 28 urges the window 31 upwardly to maintain the retaining flange 44 in its groove in the upper portion 43a of the seal 43, and at the same time urges the window laterally inwardly to seat the side portions 43b of the seal on their respective seats 45. In this position of the various parts, the rocker actuating flange 32, which preferably extends the full width of the window opening 14 covers and conceals the sill extrusion 19, the upper portion of the wall liner 22, and the rivets 24, and thereby eliminates the need for a trim strip across this portion of the window frame structure.

In order to free the window 31 from its frame structure 15, the latch clip 40 is withdrawn as shown in FIG. 2 to release the rocker actuating flange 32, and the latter is swung upwardly to its position shown in FIG. 2. Since the actuating flange is several times the radial length of the eccentric flange 30, the powerful force exerted by the foregoing movement swings the latter flange outwardly to its position of FIG. 2, thereby forcing the lower portion of the window 31 outwardly and freeing the sides of the seals from their seats, and the eccentric flange 30 from its groove 47 in the seal 43. From this position the lower end of the window may be swung outwardly free of the eccentric flange 30 and released from the upper flange 44. In some instances it may be desirable to substitute a conventional hinge for the illustrated flange and groove connection at the top of the window, in which case the window, when released from the flange 30 as in FIG. 2 would be free to swing outwardly about the axis of such hinge to open position.

To install the window 31 in the frame structure 15, with the rocker 28 swung to its window releasing position of FIG. 2, the bottom seal portion 43c is placed thereon with the groove 47 therein in register with the free end of the eccentric flange 30, and the groove in the seal top portion 43a positioned to receive the upper retaining flange 44. With the latch clip 40 withdrawn to clear the actuating flange 32, the rocker 28 is then swung to its window sealing position of FIG. 1, thereby seating the window 30 in the frame structure 15 as shown in FIG. 1.

The invention provides a simple, strong, well sealed and securely closed window for use in a bus or other vehicle, and one which can be quickly and easily released for opening or removal in the event of an emergency.

Having thus described my invention, what I claim as new and useful and desire to protect by U.S. Letters Patent is:

1. A knockout window for a vehicle such as a bus or mass transit car comprising, in combination,
    a window frame structure surrounding a window opening,
    a window retaining flange extending along one side of the window frame structure and directed inwardly toward the window opening,
    a window fitted to the window frame structure, said window having a groove along each of two opposite sides thereof with the window retaining flange inserted in sealing relation in one of the grooves,
    a rocker mounting trough extending along the side of the window frame structure opposite said flange, said trough opening inwardly toward the window opening,
    a rocker mounted in said trough for rocking movement about an axis directed longitudinally of the trough,
    a flange extending lengthwise along said rocker and projecting substantially radially therefrom, said flange inserted in the groove in the other edge of the window, the rocker flange, in one rocked position of the rocker about its axis, urging the window laterally thereof toward the flange along said one side of the window frame structure, and
    force multiplying actuating means for rocking the rocker about its axis between such position and a position wherein the rocker flange is swung outwardly, thereby to withdraw it from its groove in the window and to release the window from its frame structure.

2. A knockout window as claimed in claim 1 wherein the window retaining flange and the flange on the rocker each extends substantially the entire length of the side of the window retained thereby.

3. A knockout window as claimed in claim 1 wherein the two remaining sides of the frame structure, other than those having the window retaining flange and rocker mounted respectively thereon, fit in sealing engagement with corresponding sides of the window.

4. A knockout window as claimed in claim 4 wherein two remaining the sides of the frame structure, other than those having the window retaining means and rocker mounted respectively thereon, are provided with outwardly open seats for seating corresponding edges of the window thereon.

5. A knockout window as claimed in claim 1 wherein the window comprises only a sheet of glass a resiliently compressible seal fitted marginally therearound and the grooves are in the seal.

6. A knockout window as claimed in claim 1 wherein the force multiplying means extends substantially the entire length of the side of the window along which it is mounted.

* * * * *